April 5, 1960     K. ZWICK     2,931,464
DEVICE FOR DAMPING VIBRATIONS IN A MACHINE TOOL SPINDLE
Filed Oct. 31, 1955

INVENTOR
KURT ZWICK,
by
John B. Brady
ATTORNEY

United States Patent Office 2,931,464
Patented Apr. 5, 1960

2,931,464

DEVICE FOR DAMPING VIBRATIONS IN A MACHINE TOOL SPINDLE

Kurt Zwick, Munich, Germany, assignor to Hans Deckel, Munich-Solln, Germany, and Friedrich Wilhelm Deckel, Zug, Switzerland Application October 31, 1955, Serial No. 543,796

Claims priority, application Germany November 5, 1954

7 Claims. (Cl. 188—83)

This invention relates to a device for damping the vibration in tool spindles of machine tools.

According to the invention the damping device is developed as a freely-engageable friction brake.

For the purpose of damping the vibrations of a tool spindle said friction brake is preferably in the form of a brake ring working in conjunction with the driving means or wheel engaging such spindle.

The accompanying drawing represents an embodiment of the invention by way of example:

Figure 1:
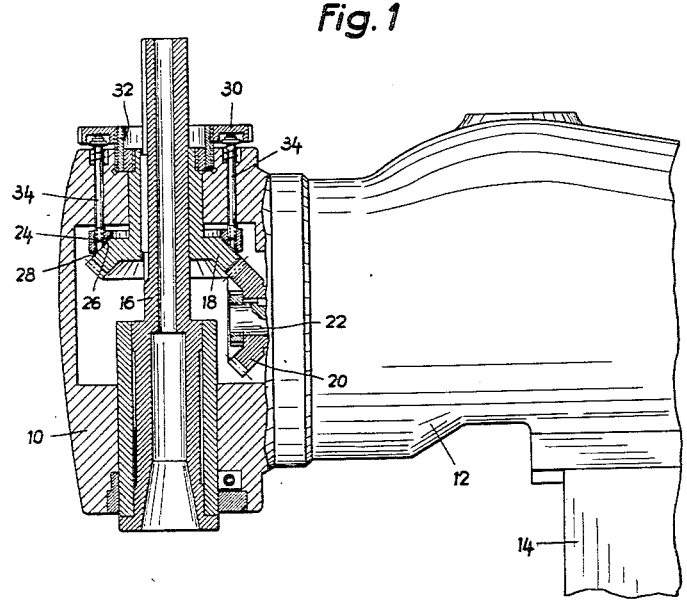
Fig. 1 is a sectional elevation showing the damping device mounted on the spindle of a swinging, drilling, or milling head.

The swinging, drilling, or milling head 10 is mounted on the headstock 12 of a suitable machine tool 14, e.g. on a milling machine as described in the U.S. patent application, Ser. No. 379,177, filed September 9, 1953, now Patent No. 2,851,910 for an invention of Kurt Zwick and Hanns Müller. The head 10 carries a hollow spindle 16 driven through a pair of bevel wheels 18, 20 by a drive shaft 22 in the headstock 12. This spindle 16 is arranged to carry the tool (not shown) in any usual manner.

In certain unfavorable working conditions, e.g. when the tool is applied laterally to a workpiece, the spindle 16 with the tool may be caused to vibrate. In order to prevent this, the head 10 is provided with damping means consisting of a freely engageable or disengageable friction brake.

Figure 2:
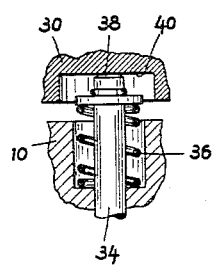
Fig. 2 is a fragmentary sectional view of a detail showing the manner in which the mass of the damping device operates as a friction brake with respect to the driving means.
Figure 3:
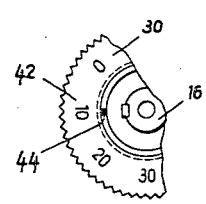
Fig. 3 is a fragmentary top plan view of the calibrated adjustable setting device by which the friction braking action against driving means may be adjustably controlled.

These means comprise a non-rotatable brake ring 24 with an inside taper 26 capable of being pressed against the outside taper 28 of the back of the gear 18. The application or release of the brake ring 24 is effected by a setting ring 30 having the form of a gland nut which can be manually screwed down on a threaded collar 32 from outside the head 10. The connection between the setting ring 30 and the brake ring 24 is formed by a number of studs 34 screwed into the brake ring 24 axially parallel to the spindle 16 and loaded by springs 36, as shown more clearly in Fig. 2. The ball-pointed ends 38 of the studs 34 bear on a pressure face 40 of the setting ring 30 (Fig. 2). A scale 42 (Fig. 3) on said setting ring 30 works opposite a fixed reference mark 44 and indicates the instantaneous position of this setting ring and consequently the setting of the friction brake.

The gland nut of the setting ring 30 is provided with a downwardly directed annular recess into which the upper ball-pointed ends 38 of the studs 34 extend and against which the setting ring 30 applies a force additional to the gravitational mass of the brake ring 24 for establishing the frictional braking action between the tapered faces 26 and 28 in opposition to the tension of springs 36.

While I have described my invention in one of its preferred embodiments, I realize that modifications may be made and desire that it be understood that no limitations upon my invention are intended other than may be imposed by the scope of the appended claims.

What I claim as new and desire to secure by Letters Patent of the United States is as follows:

1. A device for damping the vibrations in a machine tool spindle comprising a frame structure, a spindle operating within said frame structure, a gear concentrically surrounding and attached to said spindle for driving said spindle, a brake ring concentrically surrounding said spindle and establishing frictional contact with the back annular surface of said gear and means for mounting said brake ring with respect to said frame structure and means for controlling the frictional engagement of said brake ring with the back annular surface of said gear.

2. A device for damping the vibrations in a machine tool spindle as set forth in claim 1 in which the means for controlling the frictional engagement of said brake ring with the back annular surface of said gear is a manually adjustable ring member engageable with said frame structure and adjustably engaging the means for mounting said brake ring for variably applying pressure on said brake ring for controlling the frictional engagement of said brake ring with the back annular surface of said gear.

3. A device for damping the vibrations in a machine tool spindle as set forth in claim 1 in which the means for mounting said brake ring with respect to said frame structure includes coil springs interposed between said means and said frame structure for yieldingly opposing the frictional engagement of said brake ring with the back annular surface of said gear.

4. A device for damping the vibrations in a machine tool spindle as set forth in claim 1 in which the means for controlling the frictional engagement of said brake ring with the back annular surface of said gear is a manually adjustable ring member engageable with said frame structure and in which lineally extending force transmitting members project from said ring member through said frame structure to said brake ring and wherein coil springs concentrically surround each of said force transmitting members and are interposed between said frame structure and said ring member for opposing the movement of said brake ring with respect to the back annular surface of said gear.

5. A device for damping vibrations in a machine tool spindle comprising a head structure, a rotatable spindle journaled with respect to said head structure, driven means mounted on said spindle, and a friction brake means surrounding said spindle and spaced from the interior of said head structure and mounted in a position establishing frictional contact with said driven means, means for fixing said friction brake means against rotation with respect to said driven means, means for positively forcing said brake means into engagement with respect to said driven means and means for disengaging said brake means with respect to said driven means, and in which said brake means comprises a brake ring coaxially surrounding said spindle, transmission means extending through said head in a direction parallel to the axis thereof and attached to said brake ring and a manually actuated setting ring extending over said head and engaging said transmission means, and in which the means for disengaging said brake means with respect to said driven means consists of resilient means interposed between said head and the upper ends of said transmission means whereby adjustment of said setting ring with respect to said resilient means and said head effects a corresponding adjustment of said brake ring with respect to said driven means.

6. A device for damping vibrations in a machine tool spindle comprising a head structure, a rotatable spindle journaled with respect to said head structure, driven means mounted on said spindle, and a friction brake means surrounding said spindle and spaced from the interior of said head structure and mounted in a position establishing frictional contact with said driven means, means for fixing said friction brake means against rotation with respect to said driven means, means for positively forcing said brake means into engagement with respect to said driven means and means for disengaging said brake means with respect to said driven means, and in which a manually actuated setting ring is adjustably disposed immediately over said head structure and wherein there are transmission studs extending through said head structure on axes parallel with the axis of said spindle and the upper ends of said transmission studs terminating beneath said setting ring, and wherein said brake means is constituted by a brake ring concentrically mounted with respect to said driven means, the lower ends of said transmission studs being attached to said brake ring for supporting said brake ring over said driven means.

7. A device for damping vibrations in a machine tool spindle comprising a head structure, a rotatable spindle journaled with respect to said head structure, driven means mounted on said spindle, and a friction brake means surrounding said spindle and spaced from the interior of said head structure and mounted in a position establishing frictional contact with said driven means, means for fixing said friction brake means against rotation with respect to said driven means, means for positively forcing said brake means into engagement with respect to said driven means and means for disengaging said brake means with respect to said driven means, and in which a manually actuated setting ring is disposed over said head structure and wherein there are transmission studs extending through said head structure on axes parallel with the axis of said spindle, the upper ends of said studs terminating beneath said setting ring and connected at their lower ends with said brake means, and wherein the means for disengaging said brake means with respect to said driven means consists of spring means interposed between said head structure and the upper ends of said studs for urging said studs into contact with the under surface of said setting ring, said setting ring being adjustable to move said brake means into engagement with said driven means against the force exerted by said spring means.

References Cited in the file of this patent

UNITED STATES PATENTS

| 1,711,003 | Uhl | Apr. 30, 1929 |
| 1,788,761 | Ernst | Jan. 13, 1931 |
| 2,412,499 | Ernst | Dec. 10, 1946 |
| 2,871,993 | Hoelscher | Feb. 3, 1959 |

FOREIGN PATENTS

| 896,435 | Germany | Nov. 12, 1953 |